(12) United States Patent
Suzuki et al.

(10) Patent No.: US 7,354,163 B2
(45) Date of Patent: Apr. 8, 2008

(54) ANTIGLARE FILM AND IMAGE DISPLAY APPARATUS

(75) Inventors: Hiroko Suzuki, Shinjuku-Ku (JP); Yukimitsu Iwata, Shinjuku-Ku (JP); Fumihiro Arakawa, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 242 days.

(21) Appl. No.: 10/489,000

(22) PCT Filed: Feb. 3, 2003

(86) PCT No.: PCT/JP03/01063

§ 371 (c)(1),
(2), (4) Date: Mar. 10, 2004

(87) PCT Pub. No.: WO03/067287

PCT Pub. Date: Aug. 14, 2003

(65) Prior Publication Data

US 2004/0240070 A1    Dec. 2, 2004

(30) Foreign Application Priority Data

Feb. 8, 2002    (JP) .............................. 2002-031675

(51) Int. Cl.
*G02B 27/00* (2006.01)
*G02B 13/20* (2006.01)

(52) U.S. Cl. ........................ 359/601; 359/599; 428/212

(58) Field of Classification Search ................ 359/599, 359/601–614; 349/112, 59–6; 428/212, 428/323
See application file for complete search history.

(56) References Cited

U.S. PATENT DOCUMENTS

| | | | | |
|---|---|---|---|---|
| 6,111,699 | A * | 8/2000 | Iwata et al. ................. | 359/599 |
| 6,217,176 | B1 * | 4/2001 | Maekawa .................... | 359/601 |
| 6,419,366 | B1 * | 7/2002 | Namioka ..................... | 359/601 |
| 6,490,012 | B1 * | 12/2002 | Takatani ...................... | 349/12 |
| 6,696,140 | B2 * | 2/2004 | Suzuki ........................ | 428/212 |
| 6,741,307 | B2 * | 5/2004 | Matsunaga et al. ......... | 349/112 |
| 6,771,335 | B2 * | 8/2004 | Kimura et al. .............. | 349/112 |
| 7,095,464 | B2 * | 8/2006 | Ito .............................. | 349/112 |

FOREIGN PATENT DOCUMENTS

| | | |
|---|---|---|
| JP | 6-250001 | 9/1994 |
| JP | 11-305010 | 11/1999 |
| JP | 11-326903 | * 11/1999 |
| JP | 2000-180973 | 6/2000 |
| JP | 2001-42108 | 2/2001 |
| JP | 2001-66701 | 3/2001 |
| JP | 2001-91707 | 4/2001 |
| JP | 2001-343646 | 12/2001 |

* cited by examiner

*Primary Examiner*—Thong Q Nguyen
(74) *Attorney, Agent, or Firm*—Oliff & Berridge, PLC

(57) ABSTRACT

An antiglare film (1) comprises: a transparent base film (2), a light-diffusing layer (3) formed on the transparent base film (2), and an antiglare layer (4) formed on the light-diffusing layer (3). The antiglare film (1) has an internal haze value in the range of 35 to 75 and a total haze value in the range of 45 to 85. The light-diffusing layer (3) and/or the antiglare layer (4) contains translucent particles coated with a low-refraction coating.

15 Claims, 2 Drawing Sheets

ANTIGLARE FILM AND IMAGE DISPLAY APPARATUS

TECHNICAL FIELD

The present invention relates to an antiglare film to be placed over the screens of various displays, particularly, the screens of high-definition displays to reduce the glare of the screens.

According to the present invention, the antiglare film may have an antireflection function or may have the function of a polarizer to be placed over the screen of a liquid crystal display. The present invention includes an image-displaying apparatus combined with a display.

BACKGROUND ART

A known antiglare film such as disclosed in JP11-305010A includes a transparent base film, and an antiglare layer formed over the base film. The antiglare layer is formed of a material containing a transparent resin, and a diffusing material dispersed in the transparent resin and having a refractive index differing from that of the transparent resin by a value in the range of 0.01 to 0.5. The surface of the antiglare layer not facing the transparent base film has a haze value (external haze value) in the range of 7 to 30, and the antiglare layer has an internal haze value in the range of 1 to 15. This prior art antiglare film placed over the screen of an ordinary liquid crystal display substantially prevents scintillation (surface glaring), which causes the local glaring of images, and makes it possible to see excellent images having a high black density on a screen that does not become whitish.

The pixel density, i.e., the number of pixels in 25.4 sq. mm (1 sq. in.), of ordinary liquid crystal displays is in the range of about 100 to about 150 pixels/25.4 sq. mm. Therefore, the conventional antiglare film used in combination with such ordinary liquid crystal displays makes it possible to see images without any particular problems. However, it was found that problems arise when the conventional antiglare film is used in combination with liquid crystal displays having greater pixel densities.

For example, some high-definition liquid crystal displays have a pixel density in the range of about 200 to about 300 pixels/25.4 sq. mm, which is twice or greater than twice the pixel density of ordinary liquid crystal displays. One of the objects of increasing pixel density is to display images in a higher definition by a general purpose display, and another object is to provide a foldable display in the form of a flexible sheet and, more particularly, to provide a liquid crystal display sheet.

The liquid crystal display sheet can be used instead of a paper sheet carrying an image printed by a printer. When the liquid crystal display sheet is used for such a purpose, the image displayed by the liquid crystal display sheet is seen at close range and hence the image must be displayed in high definition. The image often includes many characters and lines. Since characters, differing from video pictures, are looked at deliberately, the characters become illegible if the characters have rugged outlines. Rugged lines also are illegible. Thus, the pixel density is increased to solve such problems.

When the conventional antiglare film is placed over the screen of a display having a pixel density twice that of the ordinary display, no particular problem arises in parts where openings in a black mask (or black matrix consisting of vertical and horizontal black lines) masking spaces between the pixels are coincident with protrusions of the antiglare film. However, it was found that parts where openings in the black mask are coincident with recesses of the antiglare film glare cause scintillation, seriously spoiling the visibility of characters, lines, pictures or photographs, particularly the visibility of characters and lines.

Glaring of parts where openings in the black mask are coincident with recesses of the antiglare film can be prevented when the diffuser content of the antiglare layer is increased by way of experiment, but the antiglare film tends to whiten, the transparency of the antiglare film decreases, and the transmission visibility and contrast of images are reduced. Thus, increase in the diffuser content of the antiglare layer is undesirable.

DISCLOSURE OF THE INVENTION

The present invention has been made in view of the foregoing problems and it is therefore an object of the present invention to provide an antiglare film capable of preventing scintillation (surface glaring) due to the interference between the black mask of the display and irregularities in the surface of the antiglare film when the antiglare film is applied to a high-definition display having a pixel density twice or greater than twice the pixel density of ordinary liquid crystal displays, and of improving the transmission visibility and contrast of images, and to provide an image-displaying apparatus.

The inventors of the present invention studied the light-scattering effect of the irregular surface of the antiglare layer of the conventional antiglare film and the light-diffusing effect of the light-diffusing resin and translucent particles contained in the antiglare layer to solve the foregoing problems, and successfully resolved the problems of both scintillation (surface glaring), and the transmission visibility and contrast of images by making the internal haze value and the total haze value fall in desired ranges, respectively, and matching the difference between the internal haze value and the total haze value.

An antiglare film according to the present invention comprises: a transparent base film, and an antiglare layer formed on the transparent base film; wherein the antiglare film has an internal haze value in the range of 35 to 75 and a total haze value in the range of 45 to 85, and the total haze value is greater than the internal haze value.

In the antiglare film according to the present invention, the difference between the total and the internal haze value is in the range of 3 to 15.

The antiglare film according to the present invention has an antiglare function, does not cause whitening, and scatters image light to prevent scintillation (surface glare).

In the antiglare film according to the present invention, a light-diffusing layer is sandwiched between the transparent base film and the antiglare layer.

In the antiglare film according to the present invention, the antiglare layer contains first translucent particles, and the first translucent particles are coated with a first low-refraction coating.

In the antiglare film according to the present invention, the light-diffusing layer contains second translucent particles, and the second translucent particles are coated with a second low-refraction coating.

In the antiglare film according to the present invention, the antiglare layer contains first translucent particles coated with a first low-refraction coating, and the light-diffusing layer contains second translucent particles coated with a second low-refraction coating.

An antiglare film according to the present invention comprises: a transparent base film; a light-diffusing layer formed on the transparent base film; and an antiglare layer formed on the light-diffusing layer; wherein the light-diffusing layer contains second translucent particles, and the second translucent particles are coated with a second low-refraction coating.

The antiglare film according to the present invention has an antiglare function, scatters image light to prevent scintillation (surface glare), and the light-diffusing layer prevents whitening and improves the antiglare function.

In the antiglare film according to the present invention, fine irregularities are formed on a surface of the antiglare layer on the opposite side of the transparent base film, and the centerline average surface roughness of the fine irregularities is in the range of 0.1 to 2 μm.

In the antiglare film according to the present invention, a low-refraction layer having a refractive index lower than that of the antiglare layer is formed over a surface of the antiglare layer on the opposite side of the transparent base film.

In the antiglare film according to the present invention, a high-refraction layer having a refractive index higher than that of the antiglare layer, and a low-refraction layer having a refractive index lower than that of the high-refraction layer are formed in that order on a surface of the antiglare layer on the opposite side of the transparent base film.

In the antiglare film according to the present invention, a medium-refraction layer having a refractive index higher than that of the antiglare layer, a high-refraction layer having a refractive index higher than that of the medium-refraction layer, and a low-refraction layer having a refractive index lower than that of the high-refraction layer are formed in that order on a surface of the antiglare layer on the opposite side of the transparent base film.

The antiglare film according to the present invention has an antiglare function, makes the screen of a display look bright, and the light-diffusing layer improves the antiglare function.

In the antiglare film according to the present invention, the low-refraction layer is formed of a conductive material.

In the antiglare film according to the present invention, at least either the high-refraction layer or the low-refraction layer is formed of a conductive material.

In the antiglare film according to the present invention, at least the medium-refraction layer, the high-refraction or the low-refraction layer is formed of a conductive material.

In the antiglare film according to the present invention, a transparent conductive layer is sandwiched between the transparent base film and the antiglare layer, and the antiglare layer contains conductive particles.

In the antiglare film according to the present invention, a transparent conductive layer is formed between the transparent base film and the light-diffusing layer or between the light-diffusing layer and the antiglare layer, and the antiglare layer or the light-diffusing layer contains conductive particles.

The antiglare film according to the present invention having conductivity prevents the adhesion of dust thereto in a manufacturing process, prevents becoming defective due to dust, increases the yield of the manufacturing process, and improves the quality of displayed images.

In the antiglare film according to the present invention, a polarizer, and a protective layer for protecting the polarizer are formed in that order on a surface of the transparent base film on the side of the antiglare layer.

The antiglare film according to the present invention having a polarizing function curtails the base film, and is excellent in effects on cost reduction and resources conservation.

An image displaying apparatus according to the present invention comprises: a display capable of forming an image by reflected light reflected by pixels or by transmitted light passed through the pixels; and an antiglare film including a transparent base film, a light-diffusing layer formed on the transparent base film and containing second translucent particles coated with a second low-refraction coating, and an antiglare layer formed over the light-diffusing layer; wherein the transparent base film of the antiglare film of the antiglare film faces the display.

An image displaying apparatus according to the present invention comprises: a display capable of forming an image by reflected light reflected by pixels or by transmitted light passed through the pixels; and an antiglare film including a transparent base film, a light-diffusing layer formed on the transparent base film, and an antiglare layer formed on the light-diffusing layer; wherein the light-diffusing layer contains second translucent particles, the second translucent particles are coated with a second low-refraction coating, and the transparent base film of the antiglare film faces the display.

The antiglare film according to the present invention does not cause scintillation (surface glaring) when applied to a high-definition display, and improves the transmission visibility and contrast of images displayed by the display, and the display apparatus according to the present invention is excellent in visibility.

BEST MODE FOR CARRYING OUT THE INVENTION

Construction of Antiglare Film

Referring to FIG. 1(a), an antiglare film according to the present invention comprises a transparent base film 2, and an antiglare layer 4 formed on one of the surfaces of the transparent base film 2. Preferably, an antiglare film 1 according to the present invention comprises a transparent base film 2, a light-diffusing layer 3 formed on one of the surfaces of the transparent base film 2, and an antiglare layer 4 formed on the light-diffusing layer 3.

One or a plurality of layers differing from the antiglare layer 4 in refractive index may be disposed on the upper surface, of the antiglare layer 4 to provide the antiglare film 1 of the present invention with an antireflection property. For example, a low-refraction layer L having a refractive index lower than that of the antiglare layer 4 may be disposed on the upper surface of the antiglare layer 4 of the antiglare film 1 as shown in FIG. 2(a) in addition to a laminated structure shown in FIG. 1(a) or 1(b) to provide the antiglare film 1 with an antireflection property.

A high-refraction layer H having a refractive index higher than that of the antiglare layer 4, and a low-refraction layer L having a refractive index lower than that of the high-refraction layer H may be disposed in that order on the upper surface of the antiglare layer 4 of the antiglare film 1 as shown in FIG. 2(b) in addition to the laminated structure shown in FIG. 1(a) or 1(b) to provide the antiglare film 1 with an antireflection property.

A medium-refraction layer M having a refractive index higher than that of the antiglare layer 4, a high-refraction layer H having a refractive index higher than that of the medium-refraction layer M, and a low-refraction layer L having a refractive index lower than that of the high-refraction layer H may be disposed in that order on the antiglare layer 4.

Figure 3:
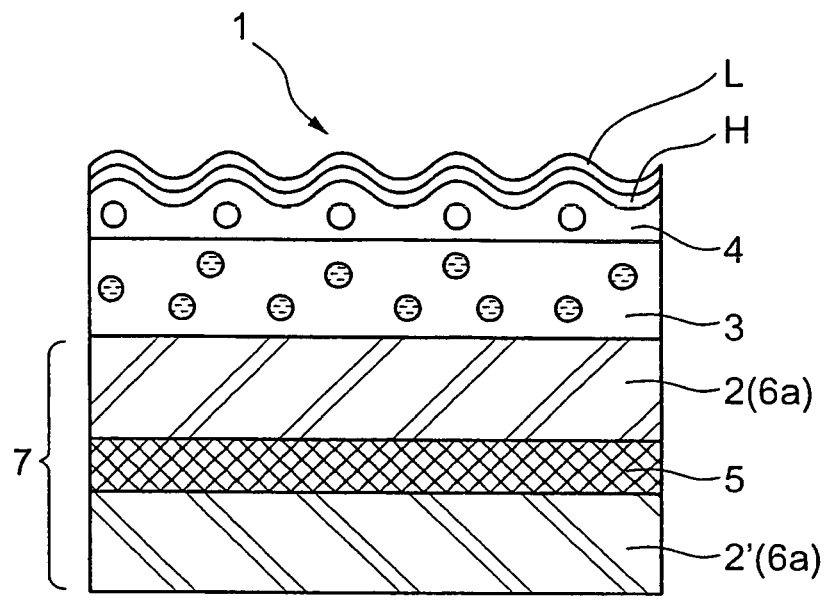
FIG. 3 is a sectional view of an antiglare film provided with a polarizer.

The antiglare film 1 of the present invention may be a polarizing film (also called as polarizing plate) including an antiglare polarizer. In a liquid crystal display, polarizing plates are attached to the front and the back surface of the liquid crystal display. Therefore, the antiglare film 1 may be applied to the polarizing plate. As shown in FIG. 3, a polarizing film 7 is formed by sandwiching a polarizer 5 between protective, transparent plastic films 2, 2'. The transparent plastic film 2, i.e., a protective layer 6a, may be used as the base film of the antiglare film 1, and the antiglare layer 4, or the light-diffusing layer 3 and the antiglare layer 4, and, if necessary, the high-refraction layer H and the low-refraction layer L are disposed on the transparent plastic film 2. Thus, one film and an adhesive layer can be omitted.

An antiglare film formed by using the transparent plastic film 2 of the polarizing film 7 as a transparent base film is within the scope of the present invention. A laminated structure formed by laminating the antiglare layer 4, or the light-diffusing layer 3 and the antiglare layer 4, and, when necessary, the high-refraction layer H and the low-refraction layer L to the transparent plastic film 2, i.e., the protective layer (usually, a cellulose triacetate film) of the polarizing film 7, and a laminated structure formed by forming a bonding means for bonding the polarizer 5 to the protective layer 6a on the lower surface of the protective layer 6a are antiglare films within the scope of the present invention.

Construction of Image-Displaying Apparatus

Figure 4:
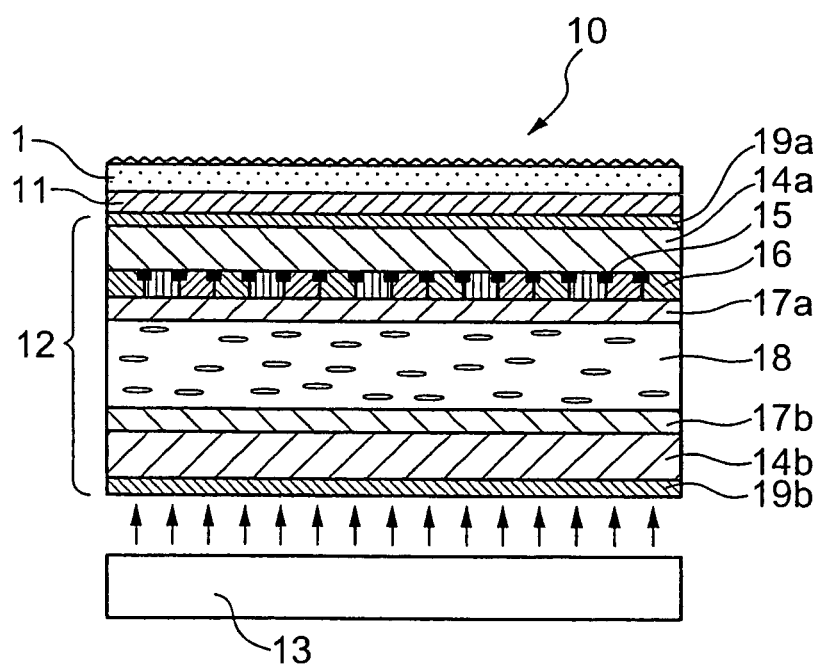
FIG. 4 is a sectional view of an image-displaying apparatus comprising a liquid crystal display and an antiglare film.

An image-displaying apparatus 10 to which the antiglare film 1 of the present invention is applied includes a liquid crystal display including a liquid crystal panel 12. As shown in FIG. 4, a back light unit 13 is disposed under the liquid crystal panel 12. The liquid crystal panel 12 has, in descending order, a polarizing plate 19a, a glass substrate 14a, a black mask 15, a color filter 16, a transparent conductive film 17a, a liquid crystal layer 18, a transparent conductive film 17b, a transparent glass substrate 14b, and a polarizing plate 19b.

The color filter 16 is formed by arranging minute color areas of three colors, namely, red (R), green (G) and blue (B) areas, in a matrix. Parts of the black mask 15 are embedded in areas between the minute color areas in the upper surface, i.e., the surface facing the viewer, of the color filter 16. Alignment films, not shown, for aligning a liquid crystal are laminated to the inner surfaces of the transparent conductive layers 17a and 17b, facing the liquid crystal layer 18.

The antiglare film 1 is bonded to the top polarizing plate 19a with an adhesive layer 11. In another case, an antiglare polarizing film is formed by laminating the light-diffusing layer 3 and the antiglare layer 4, and, when necessary, the high-refraction layer H and the low-refraction layer L to the transparent base film 2, i.e., one of the protective layers of the polarizing plate 19a, and laminating the transparent base film 2 to the other protective layer of the polarizing plate 19a. A surface of the antiglare polarizing film thus formed on the transparent base film 2 may be laminated to the glass substrate 14a.

Transparent Base Film

The base film 2 may be formed by shaping a transparent resin film, a transparent resin sheet, a transparent resin plate, such as an acrylic plate, or a transparent glass plate. It is preferable, from the industrial point of view, to use a flexible, transparent resin film, which is easy to process continuously, for forming the base film 2. The transparent resin film may be, for example, a triacetylcellulose film (TAC film or cellulose triacetate film), a polyester resin film, such as a polyethylene terephthalate film (PET film), a diacetylcellulose film, acetate butyrate cellulose film, a polyether sulfone resin, an acrylic resin film, a methacrylate resin film, a polyurethane resin film, a polyester resin film, a polycarbonate resin film, a polysulfone resin film, a polyether resin film, polymethyl pentene resin film, polyether ketone resin film a methacrylonitrile resin film. The thickness the transparent resin film is in the range of about 25 to about 100 µm, preferably, 200 µm or below.

When the antiglare film 1 is intended to be used as a polarizing plate for a liquid crystal display, it is preferable to form the transparent base film 2 of TAC that does not cause double refraction because the light-diffusing layer 3 and the antiglare layer 4, or the polarizer 5 can be laminated to the transparent base film 2 of TAC to form an antiglare polarizing film, and the antiglare polarizing film can be used for constructing a display apparatus capable of displaying images in an excellent image quality. When the light-diffusing layer 3 and the antiglare layer 4, and, when necessary, the high-refraction layer H and the low-refraction layer L are formed on the transparent base film 2 by a liquid-coating method or a vapor-phase deposition method, such as a vapor deposition method, it is particularly preferable to use a polyester resin film, such as a polyethylene terephthalate film (PET film) which is satisfactory in heat resistance, solvent resistance and mechanical strength.

Light-Diffusing Layer

The light-diffusing layer 3 of the antiglare film 1 according to the present invention diffuses light emitted by the display to increase the ratio of the amount of light rays traveling in directions other than a direction normal to the antiglare layer 4 to that of light rays traveling in the direction normal to the antiglare layer 4. The light-diffusing layer 3 is formed of a material prepared by dispersing translucent particles (second translucent particles) 3a in a translucent resin (=transparent resin). Preferably, the difference in refractive index between the translucent resin and the translucent particles 3a is in the range of 0.01 to 0.5 in view of the transparency of the light-diffusing layer. Preferably, the particle size of the translucent particles 3a is in the range of 0.1 to 7.5 µm in view of achieving a satisfactory light scattering effect.

If the refraction index difference is less than 0.01, the light-diffusing layer 3 needs to contain a large amount of the translucent particles 3a to exercise effective light diffusion. If the light-diffusing layer 3 has a large translucent particle content, adhesive strength bonding together the light-diffusing layer 3 and the transparent base film 2 or adhesive strength bonding together the light-diffusing layer 3 and the antiglare layer 4 decreases. A composite coating material containing the translucent particles 3a in a large translucent particle content for forming the light-diffusing layer 3 has an inferior coating property and hence it is difficult to form the light-diffusing layer 3 in a uniform thickness with such a composite coating material. If the refractive index difference is greater than 0.5, the transparency of the light-diffusing layer 3 decreases below a practically acceptable level, and the definition and contrast of images are deteriorated when an antiglare film including such a light-diffusing layer is applied to a display.

If the particle size of the translucent particles 3a is less than 0.1 μm, the translucent particles are liable to agglomerate in the composite coating material, the coating property of the composite coating material deteriorates, and hence it is difficult to form the light-diffusing layer 3 in a uniform thickness. If the particle size is greater than 7.5 μm, the translucent particles 3a project from the light-diffusing layer 3 causing an undesirable effect. The translucent particles 3a projecting from the light-diffusing layer 3 form an irregular interface between the light-diffusing layer 3 and the antiglare layer 4, and the irregular interface develops unintended haze.

Translucent Resin

The translucent resin 3c of the light-diffusing layer 3 is a cured resin obtained by curing an ionizing radiation curable resin produced by polymerizing an oligomer and/or a monomer having functional groups capable of causing polymerization reaction when radiated with ionizing radiation, such as ultraviolet radiation or electron beams, not using an initiator or using an initiator, or a cured resin obtained by curing an ionizing radiation curable resin composition. Those materials will be referred to inclusively as a cured ionizing radiation curable resin.

The oligomer or the monomer that becomes a translucent resin through polymerization is, in most cases, an oligomer or a monomer capable of radical polymerization and having ethylene double bonds. When necessary, a cationic photopolymerizing oligomer and/or a monomer, such as an epoxy-group-containing compound, may be used in combination with a cationic photoinitiator.

The cationic photopolymerizing oligomer or monomer having ethylene double bonds may be an oligomer or a prepolymer, such as a polyester resin, a polyether resin, an acrylic resin, an epoxy resin, a urethane resin, an alkyd resin, a spiro acetal resin, a polybutadiene resin, a polythiolpolyene resin, or a methacrylate of a multifunctional compound, such as a polyhydric alcohol.

An initiator to be added, when necessary, to en an oligomer or a monomer capable of radical polymerization and having ethylene double bonds may be acetophenone, benzophenone, ketal, anthraquinone, thioxanthone, an azo compound, peroide, a 2,3-dialkyldione compound, a disulfide compound, or a fluoroamine compound. An initiator to be added to an oligomer or a monomer capable of radical polymerization and having ethylene double bonds may be one or a combination of some of 1-hydroxy-cyclohexyl-phenyl-ketone (Irugakyua 184® commercially available from Ciba Specialty Chemicals), 2-methyl-1[4-(methylthio) phenyl]-2-morpholnopropane-1-on (IRUGAKYUA 907® commercially available from Chiba Specialty Chemicals), benzylmethylketone, 1-(4-dodecylphenyl)-2-hydroxy-2-methylpropane-1-on, 2-hydroxy-2-methyl-1-phenyl-propane-1-on, 1-(4-isopropylphenyl)-2-hydroxy-2-methyl-propane-1-on or benzophenone.

In most cases, the translucent resin 3c is a cured resin obtained by curing an ionizing radiation curable resin. The cured resin obtained by curing an ionizing radiation curable resin may contain a solvent-soluble resin. In most cases, the solvent-soluble resin is a thermoplastic resin.

The thermoplastic resin may be a general thermoplastic resin, such as a phenolic resin, a urea resin, a diarylphthalate resin, a melamine resin, a guanamine resin, an unsaturated polyester resin, a polyurethane resin, an epoxy resin, an aminoalkyd resin, a melamine-urea copolycondensate, a silicone resin and a polysiloxane resin.

Translucent Particles

The light-diffusing layer 3 contains the dispersed translucent particles 3a having a refractive index differing from that of the translucent resin 3c by a value in the range of 0.01 to 0.5, and a particle size preferably in the range of 0.1 to 7.5 μm. Plastic beads are suitable for use as the translucent particles 3a. Preferably, the translucent particles 3c are those of a polystyrene resin, a formaldehyde resin, an amino resin, a urea resin, a phenolic resin, a melamine resin, a benzoguanamine resin, xylene resin, an acrylic resin, a polycarbonate resin, a polyethylene resin, or a polyvinyl chloride resin. More concretely, the translucent particles 3a are polystyrene resin beads (refractive index: 1.59), melamine resin beads (refractive index: 1.57), benzoguanamine-formaldehyde copolycondensate beads (refractive index: 1.57), melamine-benzoguanamine-form-aldehyde copolycondensate beads (refractive index: 1.57), melamine-formaldehyde copolycondensate beads (refractive index: 1.57), acrylic resin beads (refractive index: 1.49), acryl-styrene copolymer resin beads (refractive index: 1.54), polycarbonate resin beads, polyethylene resin beads or polyvinyl chloride resin beads. The translucent particles 3a may be those of one resin or those of two or more resins.

Formation of Light-diffusing Layer

A composite coating material for forming the light-diffusing layer 3 is prepared by homogeneously mixing the translucent resin 3c, the translucent particles 3a. When necessary, the composite coating material contains an initiator, an inorganic filler as an antisettling agent, a crosslinker, a polymerization accelerator, a surface-active agent, a solvent, and a viscosity modifier. The composite coating material thus prepared is spread in a film over the surface of the transparent base film 2 by a known coating method, such as a spin coating method, a boiler coating method, a dip coating method, a spray coating method a slide coating method, a bar coating method, a roll coating method, a gravure reverse coating method or a meniscus coating method, or by a printing method, such as a flexographic method, a screen printing method or a gravure printing method.

The film of the composite coating material thus formed is cured by a proper curing method. If the composite coating material contains a solvent, the film is heated in an oven or by flowing hot air with a hot-air blower to evaporate the solvent, and then the film is irradiated with ionizing radiation, such as ultraviolet radiation or electron beams, for polymerization. Ultraviolet radiation may be emitted by an extra-high-pressure mercury lamp, a high-pressure mercury lamp, a low-pressure mercury lamp, a carbon arc lamp, a xenon arc lamp or a metal halide lamp. The electron beam may be such as having energy in the range of 50 to 1000 keV, preferably, in the range of 100 to 300 keV and emitted by a Cockcroft-Walton accelerator, a van de Graaff accelerator, a resonance transformer accelerator, an insulated-core transformer accelerator, a linear accelerator, a Dynamitron accelerator or a high-frequency accelerator.

Preferably, the thickness of the light-diffusing layer 3 is in the range of 2 to 30 μm to make the light-diffusing layer 3 exercise its function satisfactorily. The light-diffusing layer 3 is incapable of satisfactorily diffusing light if its thickness is below μm. If the thickness of the light-diffusing layer 3 is greater than 30 μm, the light diffusing effect of the light-diffusing layer 3 is excessively high, and the definition and contrast of images displayed by the display are deteriorated when an antiglare film including the excessively thick light-diffusing layer 3. The thickness is calculated on the basis of the amount and the specific gravity of the composite coating material forming the light-diffusing layer 3.

Refractive Index Difference

The translucent particles 3a dispersed in the translucent resin 3c are coated respectively with coatings 3b having a refractive index lower than those of the translucent resin 3c and the translucent particles 3a. Light traveled through the translucent resin 3c penetrates the coatings 3b having a small refractive index and is reflected by the surfaces of the translucent particles 3a, which provides a high diffusing effect. Since the translucent particles 3a are isolated from the translucent resin 3c, the refractive index difference between the translucent particles 3a and the translucent resin 3c is not any problem.

Since the term "low-refraction layer" is used to designate a layer formed over the antiglare layer 4 to prevent the surface reflection of the antiglare film as mentioned above, the coatings 3b having a refractive index lower than those of the translucent resin 3c and the translucent particles 3a and coating the translucent particles 3a will be designated as low-refraction coatings 3b.

Low-refraction Coating

The low-refraction coatings (second low-refraction coatings) 3b are formed of a gas, a liquid or a solid. The low-refraction coatings 3b formed of air (refraction index: 1) have a high diffusing effect. For example, a light-diffusing layer 3 was formed by using an ordinary ultraviolet-curable resin as the translucent resin, and melamine beads as the translucent particles 3a. It was found through the observation of a section of this light-diffusing layer 3 that spaces (or gaps, i.e., low-refraction coatings) having a thickness on the order of 0.1 μm were formed between the cured pearl-like melamine beads having diameters on the order of 1.5 μm, and the cured translucent resin. The spaces (the low-refraction coatings) 3b are formed due to the difference between the affinity of the surface active agent, i.e., a leveling agent, contained in the composite coating material with the translucent resin, and the affinity of the surface-active agent with the translucent particles 3a. Silicone, i.e., a representative leveling agent, is available in a polymer with reactive organic groups linked to polysiloxane side chains, one end or both ends, or side chains and both ends, or a polymer of block copolymer structure formed by alternately linking dimethyl polysiloxane and polyalkylene oxide. Silicones capable of forming the aforesaid spaces are nonreactive silicones modified by using polyethers, methylstyryls, alkyls, higher aliphatic acid esters, higher alkoxys and fluorine, respectively, silicones containing a higher fatty acid, and silicones produced by hydrophilic special modification. Reactive silicones are unable to form the aforesaid spaces. Reactive silicones are those produced by amino modification, epoxy modification, carboxyl modification, carbinol modification, methacrylic modification, mercapto modification and phenol modification, and those respectively containing aminogroups/alkoxy groups, epoxy groups/polyether groups and amino groups/polyether groups.

The translucent particles 3a may be those other than the melamine beads. Materials suitable for forming the translucent particles 3a include, formaldehyde resins, amino resins, urea resins, phenolic resins and melamine resins. Particles of formaldehyde resins, benzoguanamine resins and melamine resins are particularly preferable.

The spaces (low-refraction coatings) 3b can be formed around the translucent particles when the translucent resin 3c changes from a liquid into a solid. It is possible to form the spaces (low-refraction coatings) 3b by dispersing the translucent particles coated with a material that is absorbed by the translucent resin 3c while the translucent resin 3c is in a solidifying process or after the translucent resin 3c has solidified in the translucent resin 3c.

It goes without saying that the translucent particles 3a may be coated with a low-refraction material having a refractive index lower than those of the translucent particles 3a and the translucent resin 3c and capable of forming the low-refraction coatings 3b before dispersing the translucent particles 3a in the translucent resin 3c. Such a low-refraction material for forming the coatings remains in a liquid, a gel or a solid.

The light-diffusing layer 3 containing the translucent particles 3a dispersed in the translucent resin 3c and coated with the low-refraction coatings 3b has a high light diffusing effect. Therefore, the particle content of the light-diffusing layer 3 containing the translucent particles 3a coated with the low-refraction coatings 3b may be smaller than that of an equivalent light-diffusing layer containing translucent particles not coated with low-refraction coatings. When the antiglare film of the present invention is used, whitening of displayed images, color changes and disturbance of polarization due to the agency of the translucent particles 3a become insignificant, and displayed images can be clearly visible. The application of the antiglare film of the present invention to the display increases the viewing angle, i.e., an angular range in which images displayed by the display are satisfactorily visible.

Antiglare Layer

Figure 1:
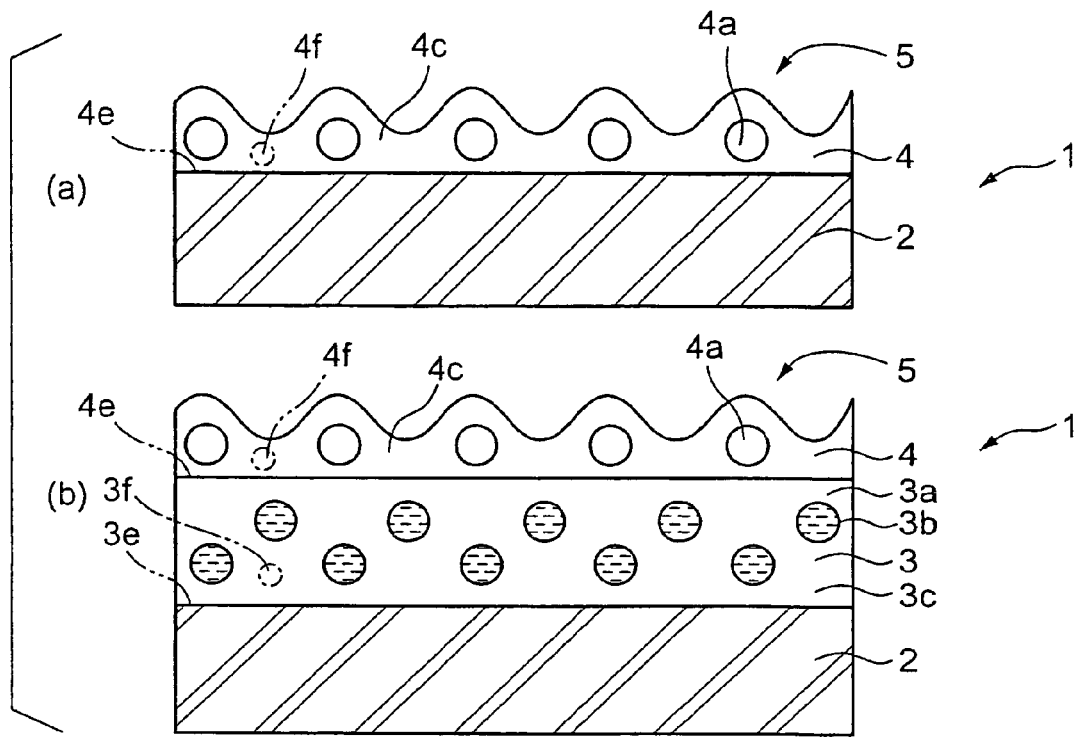
FIG. 1 is a sectional view of an antiglare film according to the present invention.

The antiglare layer 4 in the simplest construction can be formed by forming fine irregularities 5 in the outer surface, i.e., the upper surface as viewed in FIG. 1, of the resin layer of a translucent resin 4c.

Preferably, the fine irregularities have a centerline average surface roughness Ra in the range of about 0.1 to about 2 μm. The antiglare performance of the antiglare layer 4 is unsatisfactory if the centerline average surface roughness Ra is less than 0.1 μm. The light diffusing effect of the antiglare layer 4 is excessively high if the centerline average surface roughness Ra is greater than 2 μm. An antiglare film having an antiglare layer having an excessively high light-diffusing effect is undesirable because such an antiglare film applied to a display makes images displayed by the display look whitish. The thickness is calculated on the basis of the amount and the specific gravity of the composite coating material forming the antiglare layer 4.

Preferably, the antiglare layer 4 is formed of a translucent resin (=transparent resin) 4c containing translucent particles (first translucent particles) 4a dispersed therein. It is preferable that the difference in refractive index between the translucent resin 4c and the translucent particles 4a is in the range of 0.01 to 0.5 in view of maintaining the transparency of the antiglare layer 4. Preferably, the particle size of the translucent particles 4a is in the range of 1 to 7.5 μm. The translucent particles 4a contained in the antiglare layer 4 diffuse light and hence prevents scintillation (surface glare). Thus, the antiglare layer 4 has both the antiglare effect and the scintillation preventing effect owing to the irregularities formed in the surface of the antiglare layer 4, and the translucent particles 4a contained in the antiglare layer 4.

Basically, the translucent resin 4c forming the antiglare layer 4 may be the same as that forming the light-diffusing layer 3. In most cases, the translucent resin 4c is a cured resin obtained by curing an ionizing radiation curable resin produced by polymerizing an oligomer and/or a monomer having functional groups capable of causing polymerization reaction when radiated with ionizing radiation, such as ultraviolet radiation or electron beams, not using an initiator or using an initiator, or a cured resin obtained by curing an ionizing radiation curable resin composition. Those materials will be referred to inclusively as a cured ionizing radiation curable resin. The oligomer or the monomer that becomes the translucent resin 4c through polymerization is, in most cases, an oligomer or a monomer capable of radical polymerization and having ethylene double bonds. When necessary, a cationic photopolymerizing oligomer and/or a monomer, such as an epoxy-group-containing compound, may be used in combination with a cationic photoinitiator.

More concretely, organic particles or inorganic particles are suitable for use as the translucent particles 4a. Plastic beads are preferable organic particles. Preferably, the translucent particles 4a are those of a polystyrene resin, a formaldehyde resin, an amino resin, a urea resin, a phenolic resin, a melamine resin, a benzoguanamine resin, xylene resin, an acrylic resin, a polycarbonate resin, a polyethylene resin, or a polyvinyl chloride resin. More concretely, the translucent particles 4a are polystyrene resin beads (refractive index: 1.59), melamine resin beads (refractive index: 1.57), benzoguanamine-formaldehyde copolycondensate beads (refractive index: 1.57), melamine-benzoguanamine-formaldehyde copolycondensate beads (refractive index: 1.57), melamine-formaldehyde copolycondensate beads (refractive index: 1.57), acrylic resin beads (refractive index: 1.49), acryl-styrene copolymer resin beads (refractive index: 1.54), polycarbonate resin beads, polyethylene resin beads or polyvinyl chloride resin beads. Silica particles are suitable inorganic particles. The translucent particles 4a may be those of one of two or more of the foregoing materials.

The antiglare layer 4 may be formed by the same method as the light-diffusing layer 3. Although the antiglare layer 4 has the scintillation preventing effect, the lamination of the antiglare layer 4 to the light-diffusing layer 3 enhances the scintillation preventing effect. The translucent particles 4a contained in the antiglare layer 4 form the irregularities 5 in the surface of the antiglare layer 4. When the antiglare layer 4 is formed of a composite coating material containing a translucent resin as a principal component and not containing the translucent particles 4a, the antiglare layer 4 having a surface provided with the irregularities 5 may be formed by an antiglare layer forming method including the steps of pressing a forming surface provided with fine irregularities having a predetermined centerline average surface roughness (Ra) of a forming film against a film formed by spreading the composite coating material before the film hardens, irradiating the film with ionizing radiation for polymerization, and removing the forming film from the antiglare layer. When the antiglare layer 4 is formed by this method using the forming film, it is desirable to enhance the light diffusing ability of the light-diffusing layer 3 to prevent scintillation by increasing the amount of the transparent particles 3a contained in the light-diffusing layer 3.

It is preferable to form the antiglare layer 4 in the smallest possible thickness, provided that the fine irregularities 5 can be formed in the surface of the antiglare layer 4, and the antiglare layer 4 is capable of exercising the ability of a hard coating. Preferably, the thickness of the antiglare layer 4 is in the range of 0.5 to 8 μm. The antiglare layer 4 is unable to exercise the ability of a hard coating if its thickness is below 0.5 μm, and it is difficult to form the fine irregularities in the surface of the antiglare layer 4 if the thickness of the antiglare layer 4 is greater than 8 μm.

The antiglare film 1 of the present invention distinctly differentiates the light diffusing property and the antiglare property, and has a properly adjusted internal haze value (internal haze) and a properly adjusted total haze value (total haze) to acquire desired characteristics effectively and easily. Preferably, the internal haze is in the range of 35 to 75, and the total haze is in the range of 45 to 85. The glare of the antiglare film 1 is excessively high if the internal haze is below 35 and the total haze is below 45. The antiglare film 1 having an internal haze greater than 75 and a total haze greater than 85 is not preferable, because images displayed by a display look whitish and have weak contrast when the antiglare film 1 having an internal haze greater than 75 and a total haze greater than 85 is applied to the display.

The total haze must be greater than the internal haze, and a preferable haze difference between the total haze and the internal haze is in the range of 3 to 15. The antiglare property of the antiglare film 1 is unsatisfactory and the antiglare film 1 mirrors images if the haze difference is below 3. The antiglare film 1 makes images look whitish if the haze difference is above 15.

The total haze meets standards for haze (haze value) specified in K 7136, JIS. The internal haze is calculated by using an expression: (Internal haze)=Hz(A)−Hz(B), where Hz(A) is a measured haze in the antiglare layer 4 having a surface coated with a clear layer having a dry basis weight of 9 g/m² of the antiglare film 1 to smooth the surface of the antiglare layer 4, measured by a haze measuring method specified in k 7136, JIS, and Hz(b) is a measured haze in the transparent base film 2 having a surface coated with the same clear layer measured by the same haze measuring method.

Reflection Prevention

Figure 2:
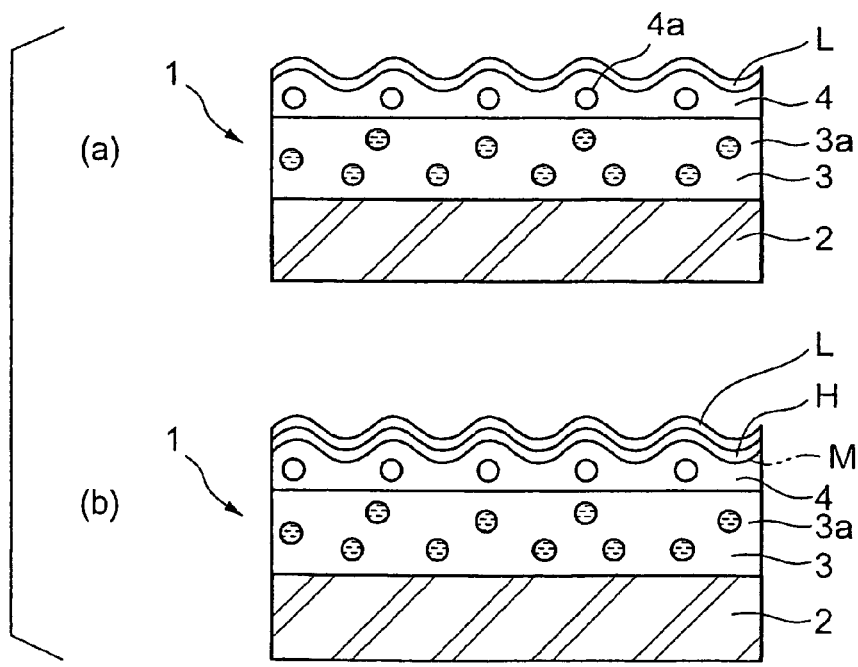
FIG. 2 is a sectional view of an antiglare film provided with a light-diffusing layer.

An antireflection antiglare film can be formed by coating the outer surface, not facing the transparent base film 2, of the antiglare layer 4 of the antiglare film 1 of the present invention with an antireflection film as shown in FIG. 2. Basically, the antireflection film has a high-refraction layer H and a low-refraction layer L. The antireflection film may further have one or two medium-refraction layers M. The layers H, L and M have different refractive indices, respectively, and the low-refraction layer L is the outermost layer facing the viewer.

Practically, the antireflection film including the layers H, L and M is laminated to the surface of an object to prevent reflection from the surface of the object. Therefore, reflection from the surface of the object can be prevented only by the single low-refraction layer L if the object has a high refractive index.

The antireflection film having the layers H, L and M can be formed so that its surface has a proper hardness by laminating the antireflection film to a hard coating layer. A hard coating layer having a proper refractive index may be one of the component layers of the antireflection film. Generally, a hard coating layer containing translucent particles having a high refractive index is used as a high-refraction layer or a medium-refraction layer.

According to the present invention, the light-diffusing layer 3 and the antiglare layer 4 have the function of a hard coating layer. Particularly, the antiglare layer 4 may be a layer having a high refractive index like the hard coating layer to use the antiglare layer 4 as a high-refraction or a medium-refraction layer.

A low-refraction layer L included in an antireflection antiglare film 1 shown in FIG. 2(a) is a film of a composite coating material containing silica, magnesium fluoride or a fluoroplastic, and having a refractive index not higher than 1.46. The low-refraction layer L may be a thin film of silica or magnesium fluoride formed by a chemical vapor deposition process or a physical vapor deposition process.

The high-refraction layer H is formed of a translucent resin containing translucent particles having a high refractive index dispersed in the translucent resin. The translucent resin is the same as that forming the light-diffusing layer 3. The translucent particles having the high refractive index may be those of $TiO_2$ (refractive index: 2.3 to 2.7), $Y_2O_3$ (refractive index: 1.87), $La_2O_3$ (refractive index: 1.95), $ZrO_2$ (refractive index: 2.05), $Al_2O_3$ (refractive index: 1.63) or such. The refractive index of the high-refraction layer H can be adjusted by properly adding the translucent particles having a high refractive index in the coating layer so that the coating has a proper diffusing property.

A composite coating material for forming the high-refraction layer H is prepared by mixing the translucent resin and the translucent particles having the high refractive index by the same method as that by which the composite coating material for forming the light-diffusing layer is prepared. The composite coating material thus prepared is spread in a film, the film is dried, if necessary, and the film is irradiated with ionizing radiation to complete the high-refraction layer H.

Titanium oxide that is used for forming the particles is an active photocatalyst. Therefore, titanium oxide particles break the chemical bonds of molecules of the translucent resin serving as a binder contained in the composite coating material to reduce the strength of the coating or deteriorate the transparency and haze of the coating by yellowing if the titanium oxide particles are dispersed in the translucent resin without surface-treating the titanium oxide particles. Therefore, it is preferable to coat titanium oxide particles with a film of an inorganic compound to reduce or nullify the photocatalytic activity of the titanium oxide particles.

Although the low-refraction layer L and the high-refraction layer H have been assumed to have individual functions in the foregoing description, the antiglare layer 4 according to the present invention may have a high refractive index and may be capable of serving also as a high-refraction layer, the low-refraction layer L may be laminated to the antiglare layer 4, the antiglare layer 4 may function as a medium-refraction layer or the high-refraction layer H and the low-refraction layer L may be formed over the antiglare layer 4. In any cases, the refractive index of the antiglare layer 4 may be raised.

The refractive index of the antiglare layer 4 can be increased to a desired high refractive index by adding a proper amount of translucent particles having a high refractive index that is used for forming the high-refraction layer H to the antiglare layer 4.

The respective refractive indices of the high-refraction layer H, the medium-refraction layer M and the low-refraction layer L are relatively high, medium and low refractive indices. As a general rule, the refractive index of the medium-refraction layer M is higher than that of the antiglare layer 4, and the refractive index of the high-refraction layer H is higher tan that of the medium-refraction layer M. The refractive index of the low-refraction layer L needs only to be lower than that of the high-refraction layer H, and hence the refractive index of the low-refraction layer L, in some cases, may be higher than that of the medium-refraction layer M. As a general rule, the refractive index of the low-refraction layer L is lower than that of the antiglare layer 4.

The low-refraction layer L and the high-refraction layer H may be formed on the antiglare layer 4 not only by spreading the aforesaid composite coating material by the so-called wet coating process, but also may be formed by a dry coating process, such as a vapor deposition process or a sputtering process or by a combination of a wet coating process and a dry coating process.

Conductivity

Either of the low-refraction layer L and the high-refraction layer H formed on the antiglare layer 4 or both the low-refraction layer L and the high-refraction layer H may contain a conductive material to make the antiglare film 1 according to the present invention conductive. The conductive material may be tin-doped indium oxide (ITO) or antimony-doped tin oxide (ATO). A layer containing a conductive material may be formed by either a wet coating process or a dry coating process.

A transparent conductive layer 3e may be provided between the transparent base film 2 and the light-diffusing layer 3, and conductive particles 3f may be dispersed in the light-diffusing layer 3 to make the antiglare film 1 conductive. A transparent conductive layer 4e may be provided between the light-diffusing layer and the antiglare layer 4, and conductive particles 3f and 4f may be dispersed in the light-diffusing layer 3 and the antiglare layer 4, respectively, to make the antiglare film 1 of the present invention conductive. The conductive particles 3f and 4f may be produced by coating silica, carbon black, metal or resin particles with gold and/or nickel.

Polarizing Plate

An antiglare film 1 according to the present invention may be provided with a laminated polarizing film 7 as a transparent base film 2 as shown in FIG. 3. Although the field of liquid crystal displays provided with a liquid crystal panel 12 often uses the term "polarizing plate" to designate such a laminated polarizing structure, such a laminated polarizing structure will be referred to in this description as a polarizing film because the polarizing structure employed in the antiglare film 1 according to the present invention is a comparatively thick film or sheet. As mentioned above, the polarizing film is formed by sandwiching a polarizer 5 formed by drawing a polyvinyl alcohol film (PVA film) containing iodine or a dye between two transparent plastic films 2, 2', such as a TAC film. The polarizer may be formed of a polyvinyl formal film, a polyvinyl acetal film or an ethylene-vinyl acetate copolymer saponified film.

In fabricating the antiglare film 1, one of the transparent plastic films 2 of the polarizing film 7 is regarded as the transparent base film 2 of the present invention. First, an antiglare film 1 is formed by forming a light-diffusing layer 3 and the antiglare layer 4 on the transparent base film 2 and, when necessary, forming aforesaid types of layers on the antiglare layer 4. For example, when a TAC film is used as the transparent plastic film 2, this structure can be an intermediate material for fabricating an ordinary polarizing film 7. The surface, not bonded to the light-diffusing layer 3, of the transparent plastic film 2 is saponified to make the same surface hydrophilic so that the adhesion between the transparent plastic film 2 and the polarizer 5 is improved.

It is possible that a problem relating to the antisaponification of the low-refraction layer L of $SiO_x$ or a stainproof layer formed on the side opposite the surface to be saponified arises in a saponification process for saponifying the surface of the transparent plastic film 2. If such a problem is expected, it is preferable that the $SiO_x$ thin film is formed after saponification and, when necessary, the stainproof layer is formed on the $SiO_x$ thin film. The polarizing film 7 is bonded to the transparent plastic film 2 after saponification. Preferably, the bonding surface of the other transparent plastic film 2 of the polarizing film 7 is processed by a saponification process, and the transparent plastic films 2, one of which is the base film 2 of the antiglare film 1 of the present invention, are bonded simultaneously to both the surfaces of the polarizer 5.

Image-Displaying Apparatus

The antiglare film 1 of the present invention is applied to the front surface of a liquid crystal display as shown in FIG. 4 to form an antiglare image-displaying apparatus 10. The display is not limited to the liquid crystal display and may be a CRT, a plasma display, an EL display or an LED display. The display may be of a self-luminous type or an illuminated type.

The antiglare film 1 of the present invention may be directly applied to the surface of a display. A composite plate formed by applying the antiglare film 1 to a transparent plate may be fixedly disposed in front of a display.

EXAMPLES

Example 1

An 80 μm thick TAC film was used as the transparent base film 2. A composite coating material having a composition shown below was spread over the base film 2 by a gravure reverse coating method to form a film of the composite coating material in a basis weight of 8 g/m$^2$. The film of the composite coating material was heated at 70° C. for 1 min for drying, and the dried film was irradiated with ultraviolet radiation at an irradiation dose of 100 mJ to form a light-diffusing layer 3 by curing the dried film.

A composite coating material having a composition shown below was spread over the light-diffusing layer 3 by a gravure reverse coating method to form a film of the composite coating material in a basis weight of 3 g/m$^2$. The film of the composite coating material was heated at 70° C. for 1 min for drying, and the dried film was irradiated with ultraviolet radiation at an irradiation dose of 100 mJ to form an antiglare layer 4 by curing the dried film.

In the following description, parts of the components of composite coating materials are by mass.

Composite Coating Material for Forming Light-diffusing Layer
  Pentaerythritol triacrylate: 100 Parts (Refractive index: 1.5, Nippon Kayaku)
  Melamine beads: 3.89 Parts (Refractive index: 1.57, Mean diameter: 1.2 μm)
  UV polymerization initiator: 6 Parts (Irugakyua-184®, Ciba Specialty Chemicals)
  Cellulose propionate: 1.25 Parts
  Nonreactive silicone leveling agent: 0.02 Parts (SH28PA®, Shinetu Kagaku Kogyo)
  Toluene: 130 Parts Composite Coating Material for Forming Antiglare Layer
  Pentaerythritol triacrylate: 100 Parts (Refractive index: 1.5, Nippon Kayaku)
  Flocculent silica: 13 Parts (Refractive index: 1.48, Mean diameter: 1 μm)
  UV polymerization initiator: 1 Part (Irugakyua-907®, Ciba Specialty Chemicals)
  UV polymerization initiator: 6 Parts (Irugakyua-184®, Ciba Specialty Chemicals)
  Cellulose acetate propionate: 1.25 Parts
  Leveling agent: 0.03 Parts (Type FZ2191®, Nippon Yunika)
  Toluene: 130 Parts
  Cyclohexanone: 50 Parts Measuring Method and Evaluation Total haze was measured by a total haze measuring method specified in K 7136 (Haze), JIS, using a haze meter HR100® (Murakami Sikisai Gijutu Kenkyu-sha). Pencil hardness was measured by a pencil hardness measuring method specified in K 5400, JIS. Hard coats were those having a hardness not lower a pencil hardness of H.

The scintillation preventing property (antiglare property) was evaluated through visual observation. A photographic light box (Raitobokkusu 45, Hakuba Shashin Sangyo) was used as a backlight unit. Test patterns respectively having resolutions of 150, 200 and 300 pixels/25.4 sq. mm (1 sq. in.) were placed on the light box, the antiglare film was bonded to a transparent plate with an adhesive so as to be spaced from the upper surfaces of the test patterns by 160 μm, i.e., a distance corresponding to the thickness of a polarizing plate, the light source of the light box was turned on, and the test patterns were observed visually to see if there were any highly luminous parts. When highly luminous parts are found, it was decided that the antiglare film was rejectable and the antiglare film was indicted by a cross. When any highly luminous parts are not found it was decided that the antiglare film was passable and the antiglare film was indicated by a circle.

A specimen for black density evaluation was prepared by attaching a 37.5 mm wide black insulating vinyl tape (Yamato-sha) to the back surfaces of the antiglare film 1. The surface of the antiglare film illuminated by light emitted by a fluorescent lamp was observed. The specimen was subjected to measurement using a color densitometer (Makubesu RD918®, Kollmorgen Instruments Corp.). A reference specimen prepared by attaching a black vinyl tape to the back surface of a transparent film was subjected to density measurement. The black density of the reference specimen was used as a reference density of 100% (for example, 2.28 for TAC). It was decided that contrast was satisfactory and the specimen was passable, and the specimen was indicated by a circle when the measured density of the specimen was 85% or above. It was decided that the specimen was rejectable, and the specimen was indicated by a cross when the measured density of the specimen was below 85%. When the specimen looked whitish and the contrast was low, it was decided that the specimen was rejectable and was indicated by a cross.

The antiglare film 1 was applied to the polarizing plate 19a, the background was concealed by crossed Nicols, and the surface of the antiglare film 1 was observed visually to see if the fluorescent lamp was mirrored.

The antiglare film 1 in Example 1 was satisfactory in physical and optical properties. The antiglare film 1 had a pencil hardness of 3H determined by a pencil hardness test using a load of 500 g, a total haze of 47.0, an internal haze of 37.0, and a total light transmittance of 92.0%. The antiglare film 1 was satisfactory and passable in scintillation preventing performance (antiglare performance) with the test patterns respectively having the resolutions of 150, 200 and 300 pixels/25.4 sq. mm.

It was found through the observation of a section of the light-diffusing layer of the antiglare film through a scanning electron beam microscope that air layers were formed around the melamine beads.

A transparent adhesive was spread over the surface of the TAC film of the antiglare film 1 in Example 1 and the antiglare film 1 was applied to the surface of a commercial liquid crystal display. An antiglare film not provided with any light-diffusing layer was applied to the surface of a commercial liquid crystal display. The viewing angles of those liquid crystal displays were compared through visual observation. It was found that the antiglare film 1 of the present invention increased the viewing angle, and the visibility of images displayed by the liquid crystal display provided with the antiglare film 1 of the present invention was satisfactory. It was considered that the light-diffusing layer 3 and the air layers surrounding the melamine beads provided the antiglare film 1 with a viewing angle increasing effect.

Although the air layer forming mechanism is not necessarily clearly known, it was supposed that the air layers were formed due to the comparatively low compatibility of the silicone used as a leveling agent with the resin.

Example 2

An antiglare film 1 in Example 2 was fabricated similarly to the antiglare film 1 in Example 1. The antiglare film 1 in Example 2 was the same as the antiglare film 1 in Example 1 except that the following composite coating materials were used for forming a light-diffusing layer and an antiglare layer.

Composite Coating Material for Forming Light-diffusing Layer
  Pentaerythritol triacrylate: 100 Parts (Refractive index: 1.5, Nippon Kayaku)
  Melamine-benzoguanamine-formaldehyde condensate beads: 4 Parts (Refractive index: 1.57, Mean diameter: 1.8 μm)
  UV polymerization initiator: 6 Parts (Irugakyua-184®, Ciba Specialty Chemicals)
  Cellulose propionate: 1.25 Parts
  Reactive silicone leveling agent: 0.04 Parts (KF6001®, Shinetu Kagaku Kogyo)
  Toluene: 130 Parts
Composite Coating Material for Forming Antiglare Layer
  Pentaerythritol triacrylate: 100 Parts (Refractive index: 1.5, Nippon Kayaku)
  Silica particles: 9 Parts (Refractive index: 1.48, Mean diameter: 1.0 μm)
  Silica particles: 6 Parts (Refractive index: 1.48, Mean diameter 1.5 μm)
  UV polymerization initiator: 6 Parts (Irugakyua-184®, Ciba Specialty Chemicals)
  Cellulose acetate propionate: 1.25 Parts
  Leveling agent: 0.04 Parts (Type FZ2191®, Nippon Yunika)
  Toluene: 105 Parts
  Cyclohexanone: 46 Parts

Example 3

An antiglare film 1 in Example 3 was fabricated similarly to the antiglare film 1 in Example 2 excepting the amount of melamine-benzoguanamine-formaldehyde condensate beads.
  Melamine-benzoguanamine-formaldehyde condensate beads: 5 Parts

Example 4

An antiglare film 1 in Example 4 was fabricated similarly to the antiglare film 1 in Example 2, excepting the amount of melamine-benzoguanamine-formaldehyde condensate beads.
  Melamine-benzoguanamine-formaldehyde condensate beads: 7 Parts

Example 5

An antiglare film 1 in Example 5 was fabricated similarly to the antiglare film 1 in Example 2, excepting the amount of melamine-benzoguanamine-formaldehyde condensate beads.
  Melamine-benzoguanamine-formaldehyde condensate beads: 9 Parts

Example 6

An antiglare film 1 in Example 6 was fabricated similarly to the antiglare film 1 in Example 2, excepting the amount of melamine-benzoguanamine-formaldehyde condensate beads.
  Melamine-benzoguanamine-formaldehyde condensate beads: 10 Parts The antiglare films 1 in Examples 2 to 6 were the same as the antiglare film 1 in Example 1 in physical properties (pencil hardness), optical properties (total haze, internal haze and total light transmittance), and scintillation preventing performance (antiglare performance), any air layers were not formed around the melamine beads, and the antiglare films 1 in Examples 2 to 6 had no effect on increasing viewing angle, which was supposed to be due to the compatibility of the fluorochemical used as the leveling agent with the resin.

Example 7

An antiglare film 1 in Example 7 was fabricated similarly to the antiglare film 1 in Example 1. The antiglare film 1 in Example 7 was the same as the antiglare film 1 in Example 1 except that the following composite coating materials were used for forming a light-diffusing layer and an antiglare layer.

Composite Coating Material for Forming Light-diffusing Layer
  Pentaerythritol triacrylate: 100 Parts (Refractive index: 1.5, Nippon Kayaku)
  Acrylonitrile-styrene beads: 20 Parts (Refractive index: 1.54, Mean diameter: 2 μm)
  UV polymerization initiator: 6 Parts (Irugakyua-184®, Ciba Specialty Chemicals)
  Cellulose propionate: 1.25 Parts
  Reactive silicone leveling agent: 0.04 Parts (KF6001®, Shinetu Kagaku Kogyo)
  Toluene: 130 Parts
Composite Coating Material for Forming Antiglare Layer
  Pentaerythritol triacrylate: 100 Parts (Refractive index: 1.5, Nippon Kayaku)
  Styrene beads: 5.8 Parts (Refractive index: 1.6, Mean diameter: 3.5 μm)
  UV polymerization initiator: 1 Parts (Irugakyua-907®, Ciba Specialty Chemicals)
  UV polymerization initiator: 6 Parts (Irugakyua-184®, Ciba Specialty Chemicals)
  Cellulose acetate propionate: 0.3 Parts
  Leveling agent: 0.03 Parts (Type FZ2191®, Nippon Yunika)
  Toluene: 105 Parts
  Cyclohexanone: 46 Parts Any air layers were not formed around the acrylonitrile-styrene beads contained in the antiglare film 1, and the antiglare film 1 had no viewing angle increasing effect, which was supposed to be due to the compatibility of the reactive silicone leveling agent with the resin.

Example 8

An 80 µm thick TAC film was used as the transparent base film 2. A composite coating material having a composition shown below was spread over the base film 2 by a gravure reverse coating method to form a film of the composite coating material in a basis weight of 8 g/m². The film of the composite coating material was heated at 70° C. for 1 min for drying, and the dried film was irradiated with ultraviolet radiation at an irradiation dose of 100 mJ to form an antiglare layer 4 by curing the dried film.

Composite Coating Material for Forming Antiglare Layer
- Pentaerythritol triacrylate: 100 Parts (Refractive index: 1.5, Nippon Kayaku)
- Melamine-benzoguanamine-formaldehyde condensate beads: 5 Parts (Refractive index: 1.57, Mean diameter: 1.8 µm)
- Silica particles: 6 Parts (Refractive index: 1.48, Mean diameter: 1.0 µm)
- Silica particles: 6 Parts (Refractive index: 1.48, Mean diameter: 1.5 µm)
- UV polymerization initiator: 6 Parts (Irugakyua-184®, Ciba Specialty Chemicals)
- Cellulose acetate propionate: 1.25 Parts
- Reactive silicone leveling agent: 0.04 Parts (KF6001®, Shinetu Kagaku)
- Toluene: 105 Parts
- Cyclohexanone: 46 Parts

Example 9

An antiglare film 1 in Example 9 was fabricated similarly to the antiglare film 1 in Example 1. The antiglare film 1 in Example 9 was the same as the antiglare film 1 in Example 1 except that the following composite coating materials were used for forming a light-diffusing layer and an antiglare layer.

Composite Coating Material for Forming Light-diffusing Layer
- Pentaerythritol triacrylate: 100 Parts (Refractive index: 1.5, Nippon Kayaku)
- Melamine-benzoguanamine-formaldehyde condensate beads: 3 Parts (Refractive index: 1.57, Mean diameter: 1.8 µm)
- UV polymerization initiator: 6 Parts (Irugakyua-184®, Ciba Specialty Chemicals)
- Cellulose propionate: 1.25 Parts
- Reactive silicone leveling agent: 0.04 Parts (KF6001®, Shinetu Kagaku Kogyo)
- Toluene: 130 Parts Composite Coating Material for Forming Antiglare Layer
- Pentaerythritol triacrylate: 100 Parts (Refractive index: 1.5, Nippon Kayaku)
- Melamine-benzoguanamine-formaldehyde condensate beads: 2 Parts (Refractive index: 1.57, Mean diameter: 1.8 µm)
- Silica particles: 9 Parts (Refractive index: 1.48, Mean diameter: 1.0 µm)
- Silica particles: 6 Parts (Refractive index: 1.48, Mean diameter: 1.0 µm)
- UV polymerization initiator: 6 Parts (Irugakyua 184®, Ciba Specialty Chemicals)
- Cellulose acetate propionate: 1.25 Parts
- Leveling agent: 0.04 Parts (TYPE FZ2191®, Nippon Yunika)
- Toluene: 105 Parts
- Cyclohexanone: 46 Parts

Example 10

An antiglare film 1 in Example 10 was fabricated similarly to the antiglare film 1 in Example 1. The antiglare film 1 in Example 10 was the same as the antiglare film 1 in Example 1 except that the following composite coating materials were used for forming a light-diffusing layer and an antiglare layer.

Composite Coating Material for Forming Light-diffusing Layer
- Pentaerythritol triacrylate: 100 Parts (Refractive index: 1.5, Nippon Kayaku)
- Melamine-benzoguanamine-formaldehyde condensate beads: 5.5 Parts (Refractive index: 1.57, Mean diameter: 1.8 µm)
- UV polymerization initiator: 6 Parts (Irugakyua-184®, Ciba Specialty Chemicals)
- Cellulose propionate: 1.25 Parts
- Reactive silicone leveling agent: 0.04 Parts (KF6001®, Shinetu Kagaku Kogyo)
- Toluene: 130 Parts Composite Coating Material for Forming Antiglare Layer
- Pentaerythritol triacrylate: 100 Parts (Refractive index: 1.5, Nippon Kayaku)
- Monodisperse polyacrylate particles: 4 Parts (Refractive index: 1.50, Mean diameter: 3.5 µm)
- UV polymerization initiator: 6 Parts (Irugakyua 184®, Ciba Specialty Chemicals)
- Cellulose acetate propionate: 1.25 Parts
- Leveling agent: 0.04 Parts (TYPE FZ2191®, Nippon Yunika)
- Toluene: 137 Parts

Example 11

An antiglare film 1 in Example 11 was fabricated similarly to the antiglare film 1 in Example 1. The antiglare film 1 in Example 11 was the same as the antiglare film 1 in Example 1 except that the following composite coating materials were used for forming a light-diffusing layer and an antiglare layer.

Composite Coating Material for Forming Light-diffusing Layer
- Pentaerythritol triacrylate: 100 Parts (Refractive index: 1.5, Nippon Kayaku)
- Melamine-benzoguanamine-formaldehyde condensate beads: 5.7 Parts (Refractive index: 1.57, Mean diameter: 1.8 µm)
- UV polymerization initiator: 6 Parts (Irugakyua-184®, Ciba Specialty Chemicals)
- Cellulose propionate: 1.25 Parts
- Reactive silicone leveling agent: 0.04 Parts (KF6001®, Shinetu Kagaku Kogyo)
- Toluene: 138 Parts Composite Coating Material for Forming Antiglare Layer
- Pentaerythritol triacrylate: 100 Parts (Refractive index: 1.5, Nippon Kayaku)
- Monodisperse polyacrylate particles: 21 Parts (Refractive index: 1.50, Mean diameter: 3.5 µm)
- UV polymerization initiator: 6 Parts (Irugakyua 184®, Ciba Specialty Chemicals)
- Cellulose acetate propionate: 1.25 Parts
- Leveling agent: 0.04 Parts (TYPE FZ2191®, Nippon Yunika)
- Toluene: 156 Parts Table 1 shows measured data on the antiglare films in Examples 1 to 11 and the results of evaluation of the same. The antiglare films in Examples 1 to 11 were passable in all the evaluation items.

TABLE 1

| Examples | Total haze | Internal haze | Total light transmittance | Pencil hardness | Antiglare Performance | Black density | Mirroring |
|---|---|---|---|---|---|---|---|
| Example 1 | 47.0 | 37.0 | 92.0 | 3H | ○ | ○ | ○ |
| Example 2 | 47.0 | 35.2 | 90.6 | 3H | ○ | ○ | ○ |
| Example 3 | 52.3 | 42.5 | 90.5 | 3H | ○ | ○ | ○ |
| Example 4 | 61.8 | 50.5 | 90.2 | 3H | ○ | ○ | ○ |
| Example 5 | 74.6 | 65.7 | 90.0 | 3H | ○ | ○ | ○ |
| Example 6 | 82.3 | 74.2 | 89.8 | 3H | ○ | ○ | ○ |
| Example 7 | 41.3 | 31.3 | 91.5 | 3H | ○ | ○ | ○ |
| Example 8 | 52.3 | 42.5 | 90.5 | 3H | ○ | ○ | ○ |
| Example 9 | 53.1 | 41.4 | 90.3 | 3H | ○ | ○ | ○ |
| Example 10 | 47.8 | 44.7 | 90.6 | 3H | ○ | ○ | ○ |
| Example 11 | 59.3 | 45.0 | 90.6 | 3H | ○ | ○ | ○ |

Example 12

A light-diffusing layer and an antiglare layer were formed similarly to those of Example 1, except that ultraviolet radiation at an irradiation dose of 18 mJ was used for curing the antiglare layer to make the antiglare layer semirigid. A composite coating material of the following composition for forming a low-refraction layer was spread in a 0.1 µm thick film over the semirigid antiglare layer 4 by a gravure reverse coating method. The film was heated at 40° C. for 2 min for drying, and then, the dried film was irradiated with ultraviolet radiation at an irradiation dose of 300 mJ for curing to form a low-refraction layer.

Composite Coating Material for Forming Low-refraction Layer

Silicone-containing vinylidene fluoride copolymer: 10 Parts
  (TM086®, JSR)
UV polymerization initiator: 0.03 Parts (Irugakyua-184®, Ciba Specialty Chemicals)
Methyl isobutyl ketone: 15 Parts
The low-refraction layer had a refraction index of 1.41.

Example 13

An antiglare film 1 in Example 13 was fabricated similarly to the antiglare film 1 in Example 12 except that the following composite coating material for forming a high-refraction antiglare layer was used.

Composite Coating Material for Forming Antiglare Layer

Pentaerythritol triacrylate (PETA): 100 Parts (Refractive index: 1.5, Nippon Kayaku)
Acrylonitrile-styrene beads: 12.5 Parts (Refractive index: 1.57, Mean diameter: 3.5 µm)
$ZrO_2$ dispersion: 347 Parts (KZ7315® containing 53 parts PETA, JSR)
UV polymerization initiator: 1.1 Parts (Irugakyua 907®, Ciba Specialty Chemicals)
UV polymerization initiator: 7.1 Parts (Irugakyua 184®, Ciba Specialty Chemicals)
Fluorochemical leveling agent: 0.2 Parts (Type R30®, Dai Nippon Inki Kogyo)
Toluene: 326 Parts
Cyclohexanone: 152 Parts
Methyl ethyl ketone: 63 Parts
Methyl isobutyl ketone: 115 Parts The antiglare layer formed of this composite coating material had a refractive index of 1.65.

Whereas the surfaces of the antiglare films in Examples 1 to 11 had reflectances in the range of 2.5% to 3.5%, the surfaces of the antiglare films in Examples 12 and 13 had a low reflectance of 0.7%.

Example 14

An antiglare film 1 in Example 14 was fabricated by forming a 6 µm thick light-diffusing layer 3, a 3 µm thick antiglare layer 4 as a medium-refraction layer, a 150 nm thick high-refraction layer H, and a 0.1 µm thick low-refraction layer L in that order on a transparent base film 2. The light-diffusing layer 3 and the high-refraction layer H were formed of the following composite coating materials (refractive index: 1.83). The antiglare layer 4, i.e., the medium-refraction layer, was formed of the composite coating material having a refractive index of 1.65 and employed in Example 9, and the low-refraction layer L was formed of the composite coating material employed in Example 8.

The light-diffusing layer 3 and the antiglare layer 4 were irradiated with ultraviolet radiation by the method employed in Example 1. The low-refraction layer L was formed similarly to that of the antiglare film 1 in Example 8. The high-refraction layer H was formed on the antiglare layer 4 by coating the antiglare layer 4 with a film of a composite coating material having the following composition for forming a high-refraction layer by a gravure reverse coating method, the film was heated at 70° C. for 2 min for drying, and the dried film was irradiated with ultraviolet radiation at an irradiation dose of 18 mJ.

Composite Coating Material for Forming Light-diffusing Layer

Pentaerythritol triacrylate: 100 Parts (Refractive index: 1.5, Nippon Kayaku)
Melamine beads: 3.21 Parts (Refractive index: 1.57, Mean diameter: 5 µm)

UV polymerization initiator: 6 Parts (Irugakyua-184®, Ciba Specialty Chemicals)
Cellulose propionate: 1.25 Parts
Reactive silicone leveling agent: 0.04 Parts (Type FZ-3704®, Nippon Yunika)
Toluene: 130 Parts
Composite Coating Material for Forming High-reflection Layer
Pentaerythritol triacrylate: 100 Parts (Refractive index: 1.5, Nippon Kayaku)
Rutile titanium dioxide: 10 Parts (Type TT051(C)®, Ishihara Sangyo, Primary particle size: approx. 20 nm, Surface-treated with alumina and stearic acid)
Anionic functional group-containing dispersant: 2 Parts (Disupabikku 16S®, Bikkukemi Japan)
UV polymerization initiator: 0.2 Parts (Irugakyua-184®, Ciba Specialty Chemicals)
Methyl isobutyl ketone: 64.1 Parts The high-refraction layer formed of this composite coating material had a refractive index of 1.83.

The antiglare film 1 in Example 14 had a satisfactorily low reflectance of 0.3%. Images displayed by a display having the front surface coated with this antiglare film 1 had a very high visibility.

Table 2 shows measured data on the antiglare films in Examples 12 to 14 and the results of evaluation of the same.

TABLE 2

| Examples | Total haze | Internal haze | Total light transmittance | Pencil hardness | Antiglare Performance | Black density | Mirroring |
|---|---|---|---|---|---|---|---|
| Example 12 | 41.0 | 31.0 | 93.0 | 3H | ◯ | ◯ | ◯ |
| Example 13 | 41.0 | 31.0 | 94.0 | 3H | ◯ | ◯ | ◯ |
| Example 14 | 54.0 | 44.1 | 34.5 | 3H | ◯ | ◯ | ◯ |

Comparative Example 1

An antiglare film in Comparative example 1 was fabricated similarly to the antiglare film in Example 2, except that the antiglare film in Comparative example 1 contained the following beads.
Melamine-benzoguanamine-formaldehyde condensate beads: 3 Parts Comparative Example 2

An antiglare film in Comparative example 2 was fabricated similarly to the antiglare film in Example 2, except that the antiglare film in Comparative example 2 contained the following beads.
Melamine-benzoguanamine-formaldehyde condensate beads: 0.5 Parts Comparative Example 3

An antiglare film in Comparative example 3 was fabricated similarly to the antiglare film in Example 2, except that the antiglare film in Comparative example 3 contained the following beads.
Melamine-benzoguanamine-formaldehyde condensate beads: 1.1 Parts Comparative Example 4

An antiglare film in Comparative example 4 was fabricated similarly to the antiglare film in Example 2, except that the antiglare film in Comparative example 4 contained the following beads.
Melamine-benzoguanamine-formaldehyde condensate beads: 12 Parts Comparative Example 5

An antiglare film in Comparative example 5 was fabricated similarly to the antiglare film in Example 1, except that Comparative example 5 used a composite coating material for forming a light-diffusing layer and a composite coating material for forming an antiglare layer having the following compositions.
Composite Coating Material for Forming Light-diffusing Layer
Pentaerythritol triacrylate: 100 Parts (Refractive index: 1.5, Nippon Kayaku)
Melamine-benzoguanamine-aldehyde condensate beads: 5 Parts (Refractive index: 1.57, Mean diameter: 1.8 μm)
UV polymerization initiator: 6 Parts (Irugakyua-184®, Ciba Specialty Chemicals)
Cellulose propionate: 1.25 Parts
Reactive silicone leveling agent: 0.04 Parts (Type KF6001®, Shinetu Kagaku Kogyo)
Toluene: 130 Parts
Composite Coating Material for Forming Antiglare Layer
Pentaerythritol triacrylate: 100 Parts (Refractive index: 1.5, Nippon Kayaku)
Monodisperse polyacrylate particles: 3.3 Parts (Refractive index: 1.50, Mean diameter: 3.5 μm)
UV polymerization initiator: 6 Parts (Irugakyua-184®, Ciba Specialty Chemicals)
Cellulose acetate propionate: 1.25 Parts
Leveling agent: 0.04 Parts (Type FZ2191®, Nippon Yunika)
Toluene: 130 Parts Table 3 shows measured data on the antiglare films in Comparative examples 1 to 5 and the results of evaluation of the same.

TABLE 3

| Examples | Total haze | Internal haze | Total light transmittance | Pencil hardness | Antiglare Performance | Black density | Mirroring |
|---|---|---|---|---|---|---|---|
| Comparative example 1 | 43.5 | 33.5 | 90.6 | 3H | X | ○ | ○ |
| Comparative example 2 | 31.1 | 15.6 | 94.0 | 3H | X | ○ | ○ |
| Comparative example 3 | 84.5 | 76.2 | 88.7 | 3H | ○ | X | ○ |
| Comparative example 4 | 87.3 | 80.7 | 88.5 | 3H | ○ | X (whitening) | ○ |
| Comparative example 5 | 42.1 | 40.0 | 9.10 | 3H | ○ | ○ | X |

The antiglare film in Comparative example 1 lacking light-diffusing ability was passable in scintillation preventing performance (antiglare performance) with test patterns having resolutions of 150 and 200 pixels/25.4 sq. mm (1 sq. in.). However, the antiglare film in Comparative example 1 caused local scintillation (glare) with a test pattern having a resolution of 300 pixels/25.4 sq. mm (1 sq. in.). Thus, the antiglare film in Comparative example 1 was practically rejectable. The practically passable scintillation preventing performance with test patterns having resolutions of 150 and 200 pixels/25.4 sq. mm (1 sq. in.) owes to the light-diffusing effect of the antiglare layer, and the beads content greater than that of the antiglare film in Comparative example 1. The antiglare performance of the antiglare film in Comparative example 2 was below a passing level, the black densities of the antiglare films in Comparative example 3 and 4 were below a passing level. The antiglare film in Comparative example 4 whitened. The antiglare film in Comparative example was rejectable in respect of mirroring.

As apparent from the foregoing description, the antiglare film 1 of the present invention is satisfactory in antiglare performance, does not whiten, and prevents scintillation (surface glare) by diffusing image light.

The light-diffusing layer 3 enhances the antiglare function of the antiglare film. Antireflection property increases the brightness of the screen of the display. The antiglare film of the present invention having the function of a polarizing plate curtails the base film, and is excellent in effects on cost reduction and resources conservation. The antiglare film of the present invention having conductivity prevents the adhesion of dust thereto in a manufacturing process, prevents becoming defective due to dust, increases the yield of the manufacturing process, and improves the quality of displayed images.

The antiglare film of the present invention does not cause scintillation (surface glaring) when applied to a high-definition display, and improves the transmission visibility and contrast of images displayed by the display, and the display apparatus of the present invention provided with the antiglare film of the present invention is excellent in visibility.

The invention claimed is:

1. An antiglare film comprising:
a transparent base film; and
an antiglare layer formed on the transparent base film;
wherein the antiglare film has an internal haze value in a range of from 42.5 to 75 and a total haze value in a range of from 52.3 to 85, and the total haze value is greater than the internal haze value; and
wherein a difference between the total haze value and the internal haze value is in a range of from 3 to 15.

2. The antiglare film according to claim 1, wherein a light-diffusing layer is sandwiched between the transparent film and the antiglare layer.

3. The antiglare film according to claim 2, wherein the light-diffusing layer contains second translucent particles, and the second translucent particles are coated with a second low-refraction coating.

4. The antiglare film according to claim 2, wherein
the antiglare layer contains first translucent particles coated with a first low-refraction coating, and
the light-diffusing layer contains second translucent particles coated with a second low-refraction coating.

5. The antiglare film according to claim 1, wherein the antiglare layer contains first translucent particles, and the first translucent particles are coated with a first low-refraction coating.

6. The antiglare film according to claim 1, wherein fine irregularities are formed on a surface of the antiglare layer on the opposite side of the transparent base film, and the centerline average surface roughness of the fine irregularities is in the range of 0.1 to 2 µm.

7. The antiglare film according to claim 1, wherein a low-refraction layer having a refractive index lower than that of the antiglare layer is formed on a surface of the antiglare layer on the opposite side of the transparent base film.

8. The antiglare film according to claim 7, wherein the low-refraction layer is formed of a conductive material.

9. The antiglare film according to claim 1, wherein a high-refraction layer having a refractive index higher than that of the antiglare layer, and a low-refraction layer having a refractive index lower than that of the high-refraction layer are formed in that order on a surface of the antiglare layer on the opposite side of the transparent base film.

10. The antiglare film according to claim 9, wherein at least either the high-refraction layer or the low-refraction layer is formed of a conductive material.

11. The antiglare film according to claim 1, wherein a medium-refraction layer having a refractive index higher than that of the antiglare layer, a high-refraction layer having a refractive index higher than that of the medium-refraction layer, and a low-refraction layer having a refractive index lower than that of the high-refraction layer are formed in that order on a surface of the antiglare layer on the opposite side of the transparent base film.

12. The antiglare film according to claim 11, wherein at least the medium-refraction layer, the high-refraction layer or the low-refraction layer is formed of a conductive material.

13. The antiglare film according to claim 1, wherein a transparent conductive layer is sandwiched between the transparent base film and the antiglare layer, and the antiglare layer contains conductive particles.

14. The antiglare film according to claim 1, wherein a polarizer, and a protective layer for protecting the polarizer are formed in that order on a surface of the transparent base film on the opposite side of the antiglare layer.

15. An image-displaying apparatus comprising:

a display capable of forming an image by reflected light reflected by pixels or by transmitted light passed through the pixels; and an antiglare film including a transparent base film, and an antiglare layer formed on the transparent base film;

wherein the antiglare film has an internal haze value in a range of from 42.5 to 75 and a total haze value in a range of from 52.3 to 85, the total haze value is greater than the internal haze value, and the transparent base film of the antiglare film faces the display; and wherein a difference between the total haze value and the internal haze value is in a range of from 3 to 15.

* * * * *